United States Patent [19]
Lee

[11] Patent Number: 5,190,248
[45] Date of Patent: Mar. 2, 1993

[54] PROTECTION OF AIRCRAFT STRUCTURES

[75] Inventor: Peter R. Lee, Tunbridge Wells, England

[73] Assignee: Royal Ordnance plc, London, England

[21] Appl. No.: 610,237

[22] Filed: Nov. 7, 1990

[30] Foreign Application Priority Data

Nov. 8, 1989 [GB] United Kingdom ............... 8925191
Nov. 8, 1989 [GB] United Kingdom ............... 8925195

[51] Int. Cl.⁵ ............................................ B64D 45/00
[52] U.S. Cl. ................................ 244/121; 244/118.5; 137/67
[58] Field of Search ............... 244/121, 118.5, 117 R; 98/1.5, 119; 137/67, 68.2, 71, 513.3; 49/21

[56] References Cited

U.S. PATENT DOCUMENTS

| | | | |
|---|---|---|---|
| 3,211,075 | 10/1965 | Robson | 98/1.5 |
| 3,938,764 | 2/1976 | McIntyre et al. | 244/121 X |
| 4,049,221 | 9/1977 | Fountain | 244/121 X |
| 4,073,452 | 2/1978 | Gosau | 244/121 X |
| 4,432,514 | 2/1984 | Brandon | 244/121 X |
| 4,703,908 | 11/1987 | Correge et al. | 244/121 X |

Primary Examiner—Charles A. Marmor
Assistant Examiner—Carla Mattix
Attorney, Agent, or Firm—Nixon & Vanderhye

[57] ABSTRACT

In the event of sudden depressurization caused by an explosion in an aircraft cargo compartment, a blast attenuation valve is provided in the aircraft's air channels to form a barrier to the passage of air between the cargo compartment and passenger cabin. The valve contains a mixture of compressible bodies through which air can normally permeate. After an explosion, the bodies block and blast wave by compressing together due to the substantial increase in pressure.

12 Claims, 2 Drawing Sheets

PROTECTION OF AIRCRAFT STRUCTURES

BACKGROUND OF THE INVENTION

1. Field of the Invention

The present invention relates to the protection of aircraft structures from the effects of explosions.

2. Discussion of Prior Art

There have been a sufficient number of aircraft bombings, suspected bombings and foiled bombings recently for there to be dawning in the consciousness of those who travel frequently by air the worry that their lives may soon be more at risk from deliberate damage to, as opposed to accidental failure of, the complex structures in which they travel.

The precise sequence of events following the detonation of a bomb on board an aircraft depends upon the location of the bomb and the size and design of the aircraft. However, certain features are common to most events which have been investigated.

It has been observed that aircraft can survive the detonation of bombs on board, provided certain features are present. A bomb placed near the outer skin of the aircraft will, most probably, blow a hole in the skin and cause explosive decompression. However, it has often been the case that the aircraft can still land normally. The same seems to be the case even for bombs which have exploded in the luggage compartments of the older types of aircraft. Luggage in these aircraft is contained in cargo nets, rather than the standard international luggage containers that the more modern widebodied aircraft use. Indeed, the accepted minimum risk position for a bomb discovered on board any type of aircraft is to place it by a door, with the interior side of the bomb tamped with cushions. The reason for choosing this position is because of the high survivability rate observed in cases of bombs planted against the aircraft hull in regions that passengers or cleaning staff have access to, which rarely destroy vital electronics or hydraulic systems and do not always damage significant load-bearing members so as to weaken the overall structure and because of recent cases of aircraft surviving massive losses of skin around regularly shaped fatigue failures in the hull.

However, in cases where the bomb is placed in a position not adjacent to the outer skin, severe, often fatal, damage can be caused.

Passenger cabin floors are relatively light structures laid on load-bearing beams. These floor beams may be tension load carriers as in the case of Boeing 747s, because of the non-circular nature of the aircraft cross-section. It is thus very possible for a bomb to damage the floor beams and, as a result, load the aircraft skin remotely from the site of the explosion asymmetrically both before and after the hull is breached by the bomb. Blast may also travel significant distances within the hollow and open channels in the aircraft structure to emerge at points well removed from the site of the bomb to cause skin and stringer rupture at several locations on the aircraft skin. Blast may also emerge into the relatively large free space of the passenger cabin and, because of the presence of rigid and substantial structures such as galleys or toilets, reflect on to the inside of the aircraft skin remote from the bomb and do unexpected damage there.

Blast emerging from the aircraft skin either close to or remote from the site of the bomb tends to tear irregularly shaped holes (as opposed to the cases of the more regular skin failure due to fatigue or, say, loss of a hold door). Regularly shaped holes are less often associated with catastrophic failure of the aircraft than irregularly shaped ones. Irregular holes tend to suffer enlarging and further skin damage due to the outrush of cabin air and slipstream effects.

It is possible that some modern wide-bodied aircraft may be more vulnerable to bombs of a similar size to those that have not always caused crashes of smaller aircraft. One theory is that, since the wide bodied aircraft employ a skin sheeting alloy which is only slightly thicker than that used in very much smaller aircraft, the latter are much stiffer structures than the former ones. Consequently, the smaller ones can withstand greater relative damage to their skin and stringers than the larger ones.

SUMMARY OF THE INVENTION

The purpose of the present invention is to reduce the risk of failure of an aircraft structure caused by the detonation of a bomb or other explosive device thereon.

According to the present invention there is provided an aircraft structure which includes a luggage or cargo compartment and a passenger cabin and one or more air channels communicating between the two wherein in or at the end of each said channel is located a blast attenuation valve for attenuating the blast in or entering the channel from an explosion in the luggage or cargo compartment which valve comprises a collection of compressible bodies through which air can normally permeate, but which when compressed together by a substantial increase in pressure form a barrier to the passage of air.

The said channels, as in the prior art, normally allow continuous air pressure equalisation between the passenger cabin and the luggage compartment, even in the event of a depressurisation of the passenger cabin. The presence of the said valves allows any shock wave from a blast to be attenuated by the increase in path length, decrease in path width and increase in path multiplicity presented by compression of the compressible material.

The bodies of compressible material may be spheres of an elastic foamed or cellular plastics or rubber material, e.g. polybutadiene, polyisoprene, butyl rubber and the like. Alternatively, or in addition, the bodies may be hollow balls optionally filled with a compressed gas or containing a solid blast absorbent material such as vermiculite (hydrated sheet silicates in the form of pellets which open out in a worm-like fashion when subjected to external energy, e.g. heating is applied).

Preferably, the compressible bodies used in the valve are of a range of different sizes to maximise effect of the breaking up of the blast wavefront.

For example, the bodies may be spheres having diameters in the range 10 mm to 50 mm.

The compression of the bodies extracts energy from the blast wave as it passes between them. Also, the mean cross-sectional area of passages between the bodies is reduced by the compression making the passages more intricate causing a lengthening of the blast wave pulse. Both effects contribute to decreasing the energy emerging beyond the valve. After the blast wave has passed, e.g. after about 0.1 milliseconds, the bodies revert to their original shape and size allowing the normal equalisation of air pressure to be resumed.

Preferably, the valve contains a mixture of hollow and/or gas filled spheres and solid plastics and/or gas filled spheres and solid plastics or rubber foamed or filled spheres. The precise mixture selected depends upon the size of the channel to be protected. This mixture will determine the operational time constant of the valve.

The compressible bodies in the said valve may be contained in a lightweight rigid porous frame, e.g. including a net or mesh to restrain motion of the bodies out of position. Such a frame, containing the compressible bodies, may be placed over an opening of the communicating channel to be protected, the frame being larger than the channel opening.

Blast attenuation valves as aforesaid may conveniently be employed as a blast attenuation means in conjunction with other protective means described in UK Patent Application 8925192, (PCT 91/07275) 8925193, (PCT 91/07337) 8925194 (UK 2238283A) and 8925195 (UK 2239177A) by the present Applicants. Such other means include in one case a luggage or cargo container including at least one weakened face, e.g. adjacent to the aircraft hull whereby in the event of a blast emanating from the container the weakened face fails and the blast is directed through the opening so formed.

Another supplementary means which may be employed in conjunction with the present invention is to provide protection of those parts of the aircraft structure constituting hollow or open boxes leading transversely or fore and aft in the structure by a blast and fragment-proof detachable hold lining material. This is a composite material similar in construction to that used in the manufacture of the luggage containers. It is used to protect the ceiling of the cargo hold (and in addition the floor of the passenger compartment) and the floor of the cargo hold. A further supplementary means includes placing packs of a lightweight granular or pelletised blast absorbent material in open or closed channels to reduce the likelihood of blast waves travelling along such channels from reaching in an intense form regions of the aircraft structure distant from the site of the explosion, e.g. in the cargo hold. The granular or pelletised blast absorbent material increases the path length and the number of path channels and decreases the path size presented to a blast wave travelling down a channel and thereby breaks up a single blast wavefront into a set of secondary fronts which, because of their different path lengths through the material cause the sharp pressure front to be reduced in peak height and spread out in time.

The packs may conveniently comprise dust-tight bags, e.g. made of muslin formed of nylon or similar light strong material, containing the said material. Preferably the bags have significant ullage allowing them to change shape to block the channels in which they are placed.

Preferably, the blast absorbent material comprises a material which itself extracts energy from a shock wave incident thereon. A suitably preferred material is vermiculite which comprises hydrated sheet silicates in the form of pellets which open out in a worm-like fashion when subjected to external energy, e.g. heating is applied.

Preferably, the packs of blast absorbent material are placed in the channels in such a way that the impact of a blast wave against the pack will cause the pack to move to block the channel completely due to a spreading effect of the pressure wave.

Suitable means may be provided to prevent the said packs from being hurled along channels and from damaging any electrical or hydraulic systems with which they might share channels.

The channels which are particularly protected by the present invention are those forming spaces between the aircraft hull and some of the rigid inner structures e.g. where two adjacent 'I' beams meet a rib and the entrance to hollow box sections of the fuselage load bearing structures.

As an illustration, the various protective means described above when employed together operate as follows to protect the aircraft against the blast from a bomb detonated in a luggage container contained in the aircraft cargo hold.

The bomb produces blast and some fragments. It is likely that the blast field will be highly asymmetrical because of the manner in which luggage is stowed within the container, hard luggage cases giving a more directional effect than soft baggage.

The blast and fragments impinge on the interior walls of the luggage container within a millisecond. The luggage container is intended to maintain the confinement for a short period of time (up to a millisecond) whilst, at the same time channelling the effects to the aircraft hull. By this time, the full effects of the explosion will have developed and it is possible that there may be a failure taking place somewhere else in the structure of the luggage container. The container is preferably constructed so that it fails preferentially in regions nearer to the aircraft hull, as a further aid in mitigating the effects of the bomb.

The ejecta, blast and fragments, from the side of the container nearer to the hull travel at about 1 km/s across the gap between the container and the inner part of the aircraft hull, a distance typically of about 300 mm, in about a further 0.3 milliseconds, fly the 150 mm gap to the aircraft outer skin in about 0.25 milliseconds and puncture it within a further 0.2 milliseconds after the bomb initiation.

At about 1-2 milliseconds after initiation, there is a free field blast focus initiated at each of the one or more points of failure in the luggage container and the residual effects of the explosion begin to influence the cargo hold in which the luggage container is normally stowed. The hold is a compartment, or compartments, normally situated beneath the passenger cabin, which usually occupies the full width of the aircraft and which can normally accommodate luggage containers in two lines. Luggage containers may be loaded from the outside through a door and slid along rails to their locations where they may be locked in place with latches.

The cargo hold is usually lined with a thin plastics material and sound and thermal insulation packs. Many channels formed by adjacent 'I' beams and ribs or stringers running laterally or fore and aft both open and closed, have open ends readily accessible from this cargo hold area. Thus, blast escaping from the bomb-containing luggage container may enter many of these channels and be conducted to distant points in the aircraft structure to which it would seemingly have no access. Furthermore the usual thin composite lining is insufficient to protect either the passenger cabin floor support beams or the flimsy passenger cabin floor, both of which would be subject to substantial damage due to blast and/or fragments. A large measure of blast and fragment protection can be afforded for the passenger floor beams, floor itself, the open structure channels and the aircraft belly below the cargo hold by lining the hold with a layer of blast absorbent and resistant material similar to that used to construct the luggage or cargo containers themselves as described in UK Patent Application No. 8925194 and corresponding Application in other countries. This blast absorbent and resistant material is desirably placed at least in regions adjacent to the ceiling of the cargo hold and its floor, especially over areas of openings of longitudinal or transverse structural channels. It is unlikely to be possible to install the material as a single unbroken protection. It may be necessary to cut holes in it at certain locations to accommodate necessary access panels, but the aim should be to utilise the material lining the hold in such a way as to protect as large as part of the vulnerable cabin floor and belly as possible.

The luggage hold lining will be subjected to the blast typically a further 0.1 milliseconds after failure of the luggage container. At this time, fragments and reflected and direct blast from within the luggage container are likely to require further absorption by blast and fragment attenuation material lining located between the cargo hold and by blast absorbing materials and/or structure located between the passenger cabin and the luggage container.

Blast absorbing material and/or structures forming the basis of a blast valve, the subject of the present invention are preferably provided to control the air passages leading away from the cargo hold and have to function for a period of between a few tens of microseconds to a few hundreds of milliseconds to reduce the intensity of the blast entering the large open space of the passenger compartment and/or being transferred along open channels to distant parts of the structure. Provided such valves, blast absorbent materials, the hold lining material and the luggage container structure function correctly, the floor beams and the passenger cabin above the container will remain substantially intact. This will prevent the aircraft hull undergoing massive structural failure as a result of its distortion due to the blast.

Furthermore the presence of blast attenuating material e.g. vermiculite preferably located in channels within the structure will further reduce the effects of blast along them. Hence, it is unlikely that blast which has succeeded in penetrating them will be intense enough to cause hull damage remote from the explosion site.

A frequent major cause of damage produced from a blast originating in the cargo hold is the outflow of pressurised cabin air to the atmosphere. This may take several seconds to complete for a wide-bodied aircraft. The effect of the outflowing cabin atmosphere and the slipstream on jagged ends of ruptured skin is to increase the damage to the full and exacerbate the overall weakening of the aircraft. The effect may also be to render the aircraft difficult to control, because of offset loads. However, the protective means described herein would reduce the possiblity of damage to electrical or hydraulic services by confining skin loss to preferred regularly-shaped areas surrounded by properly stressed structures, so the pilots would be afforded the fullest flying control augmentation, without the progressive deterioration of aerodynamic performance which accompanies the slipstream and air outflow effects on jagged-edged holes.

BRIEF DESCRIPTION OF THE DRAWINGS

An embodiment of the present invention will now be described by way of example with reference to the accompanying drawing in which.

DETAILED DESCRIPTION OF PREFERRED EMBODIMENTS

Figure 1:
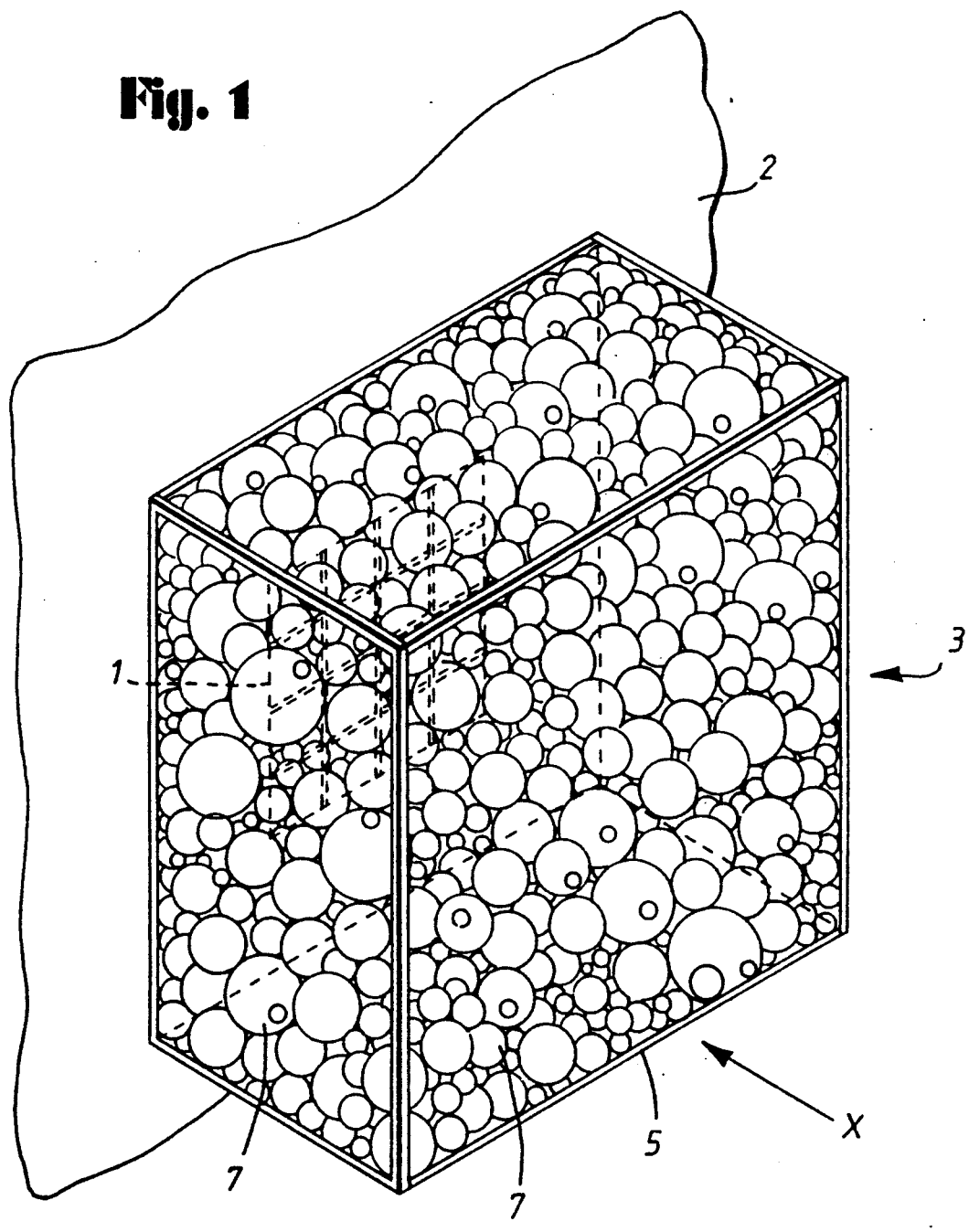
FIG. 1 is a perspective view of a blast attenuation valve being employed in an aircraft structure.

In FIG. 1 an opening 1 in a bulkhead 2 to an air pressure equalisation channel (not shown) communicating between a cargo or luggage hold and a passenger cabin is covered by a blast attenuation valve 3. Preferably, the valve 3 is located at the hold end of the channel. The valve 3 comprises a light rigid frame 5 defining the shape of a net (not shown) in which are contained a collection of spheres 7 of different sizes and made of a mixture of different materials. The materials of the spheres 7 comprise foamed plastics or rubber and solid plastics or rubber some of which are gas filled and some of which contain solid blast absorbent material such as vermiculite. When a blast is incident on the valve in the direction X the spheres 3 are compressed together to attenuate the shock wave entering the channel via the opening 1 in the manner described above.

Figure 2:
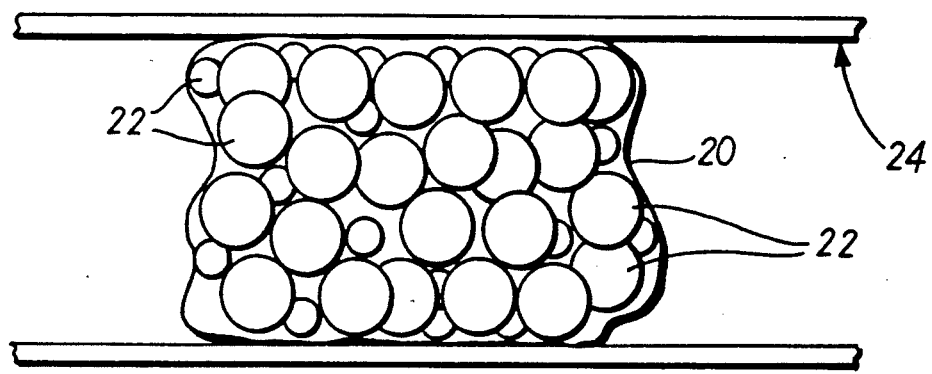
FIG. 2 is a cross-sectional view of a pack of blast absorbent material disposed within a channel in an aircraft structure.

The valve shown in FIG. 1 is preferably used as a kit in conjunction with bags of vermiculite as described above. FIG. 2 illustrates a pack 20 of lightweight granular or pelletized blast absorbent material 22 which can be located within an aircraft channel 24.

I claim:

1. An aircraft structure which includes at least one of a luggage compartment and cargo compartment, a passenger cabin and at least one air channel communicating between said at least one of a luggage compartment and cargo compartment and cabin, each of said at least one air channel includes a blast attenuation valve for attenuating a blast transmitted at least partially through the channel from an explosion in said at least one of a luggage compartment and cargo compartment wherein said valve comprises a collection of compressible bodies through which air can normally permeate, but when said bodies are compressed together by a substantial increase in pressure, form a barrier to the passage of air.

2. A structure according to claim 1 and wherein the bodies of compressible material are spheres of an elastic foamed or cellular plastics or rubber material.

3. A structure according to claim 1 wherein said bodies comprise hollow balls, said hollow balls are filled with one of compressed gas and a solid blast absorbent material.

4. A structure according to claim 3 and wherein said solid blast absorbent material is vermiculite.

5. A structure according to claim 1 and wherein the compressible bodies used in the valves are of a range of different sizes.

6. A structure according to claim 5 and wherein the bodies include spheres having diameters in the range 10 mm to 50 mm.

7. A structure according to claim 1 and wherein said bodies comprise a mixture of at least two of the following four groups: (a) foamed plastic or rubber spheres; (b) solid plastic or rubber spheres; (c) hollow balls filled with compressed gas; and (d) hollow balls filled with solid blast absorbent material.

8. A structure according to claim 1 and wherein said bodies are contained in a lightweight rigid porous frame.

9. A structure according to claim 8 and wherein the frame includes a net or mesh to restrain said bodies within said frame.

10. A structure according to claim 8 and wherein each said frame containing the compressible bodies is placed over an opening of the communicating channel to be protected, the frame being larger than the channel opening.

11. A valve adapted for use in protecting the air channels in an aircraft structure against the transmission of a blast at least partially along the channel, the valve comprising a collection of bodies through which air can normally permeate, but when said bodies are compressed together by a substantial increase in pressure form a barrier to the passage of air.

12. A valve according to claim 11 further comprising packs of lightweight granular or pelletised blast absorbent material placed in air channels within said aircraft at locations distant from a luggage or cargo compartment.

* * * * *